Patented Aug. 4, 1953

2,647,837

UNITED STATES PATENT OFFICE 2,647,837

METHOD OF PREPARING HOPS BY CATALYTIC ISOMERIZATION OF HUMULON

Václav Salač, Prague, Czechoslovakia, assignor to Ceskoslovenske pivovary, lihovary a Konservarny, narodni podnik, Prague, Czechoslovakia No Drawing. Application April 26, 1951, Serial No. 223,138. In Czechoslovakia May 27, 1949

4 Claims. (Cl. 99—50.5)

The transformation of the α hop bitter acid (humulon) during hopping has been a subject of research for many years.

During the boiling of the wort with the hops humulon changes its original characteristics and has a much bitterer taste than the original α hop bitter acid; it is known also that humulon changes most strongly in a weakly acid solution.

Practical methods for the transformation of humulon into an isomer of greater bitterness have been proposed, whereby it has become possible to obtain 30 to 50% greater bitterness than before. This means a saving of hops regardless of other factors in judging the quality of hops as regards humulon content and the like.

In view of the general shortage of hops, necessitating the most economical use thereof, suitable methods have been proposed for transforming many of the components of hop bitter acid, more particularly for transforming humulon into its isomer which is characterised by much greater bitterness than the original substance. All conditions under which this transformation is effected have also been tested.

It has been found that in the extraction of hops and preparation of hop extract the best results are obtained if the method for the catalytic transformation of humulon into its isomer is carried into effect in a very weakly acid or weakly alkaline reaction medium, between the limits pH 6.2 and pH 7.50, the optimum pH value being 6.8. This transformation is effected with a boiling duration between the limits of 10 and 120 minutes.

For this purpose a hop extract is obtained either by subjecting the hops to extraction treatment with second wort in a hop extractor or by partial direct decoction of the hops either with water of natural pH or with strongly diluted second wort.

In the methods for the preparation of hops (method of hopping) known heretofore, the hop cones are decocted directly with the wort (first wort and second wort), the normal and known transformation of humulon into its isomer being only partly effected because the hydrogen-ion concentration in the reaction medium is not of suitable intensity.

The present invention relates to a separate extraction treatment of the hop cones either by means of water or by means of weak (strongly diluted) second wort, and also to special preparation before boiling, characterized by a weakly acid or weakly alkaline medium of which the hydrogen-ion concentration is between the limits pH 6.2 and pH 7.50, which is particularly suitable for complete isomerisation of the humulon, as has been proved by tests.

In the methods known heretofore this process is effected with natural hydrogen-ion concentration, between pH 5.8 and pH 6.1, whereas according to this invention the pH value is between 6.2 and 7.50. The remainder of the method is the same is in the normal manufacture of beer.

According to the invention the importance of the fact that the hop extract is obtained separately consists also in the fact that if the hydrogen-ion concentration of the medium is kept between pH 6.2 and pH 7.50, substances which would impair the flavour (for instance tannin and the like) do not pass into the solution as would be the case if the hops were boiled directly in the second wort; furthermore, the amount of alkali used for obtaining the given pH value according to the invention is much smaller than in the case of the former direct boiling of the hops with the second wort (not separately), because the second wort contains large quantities of buffer substances (phosphates, proteins and the like) which would necessitate a large excess of alkali in order to obtain the necessary acidity (pH value) of the medium.

According to the invention the duration of boiling in the treatment of the hops according to the proposed method is between the limits of 10 minutes and 120 minutes, since if it were longer than this a certain harshness would be imparted to the bitter flavour of the beer, whereas on the other hand if it were shorter than ten minutes complete isomerisation of humulon, which is desirable according to the invention, would not be obtained.

A hop extract is obtained, as mentioned above, either according to one of the known methods (for instance in an extractor), or, according to the invention, by decocting the hop cones directly in water or diluted second wort, the latter method rendering possible extraction of about two-thirds of the humulon contained in the hops, although the hop cones which in this case remain behind after the second wort has been drawn off can be subsequently used for boiling with the wort.

In this manner it is possible to obtain a saving of 30% of the hops used.

An increase in the above-mentioned isomerisation of the humulon in a hop extract obtained either by means of the extractor or by direct decoction of the hop cones may be obtained by boiling this extract under moderately increased pressure in a pressure chamber (autoclave), the duration of boiling being adapted to the pressure and both of these factors depending on the brewery situation and also on the chemical composition of the water used. The duration of boiling under pressure must not be more than 1½ hours, and the pressure must not be more than 10 atmospheres. The boiling of the hop extract under pressure may be effected either with the natural hydrogen-ion concentration or with a hydrogen-ion concentration specially prepared according to the above-mentioned method. In the latter case however the pH value must not exceed pH 7.

It has been found moreover that increase in the isomerisation of the humulon is obtained also if the hop extract obtained by decoction of hop cones with water is not separated from the spent hops and is made to react directly in the mixture so obtained, so as to produce a hydrogen-ion concentration of between pH 6.2 and pH 7.50, and if the extract is thereupon boiled for 20 to 45 minutes more.

If this method is used the advantage is obtained that a special constructional arrangement, which is necessary in the case of separate extraction treatment of hop cones, is no longer needed, and that this method can therefore be used without additional capital investment.

Practical examples:

(1) 293 hectoliters of beer wort are to be manufactured. For manufacturing this quantity of beer wort, with the prescribed bitterness, in the normal manner, 2500 kg. of malt and 52 kg. of hops are required.

Using the new method, however, for manufacturing the same quantity of bitter wort, with the same bitterness, 2500 kg. of malt and only 40 kg. of hops are required, the hops however being prepared as follows: 55 hectoliters of water and 36 kg. of hops are boiled in a boiling copper for 40 minutes. The aqueous extract is conveyed into the mash copper through a filter. The hops carried along with the aqueous extract are drawn back through a screen into the boiling copper into which the first wort has already been filtered. The total quantity of the extract in the mash copper amounts to 36 hectoliters.

The preparation of the hop extract to bring the pH value to 6.95 is then initiated by the addition of 500 grams of soda and the extract thus prepared is boiled for half an hour. Thereupon the extract which has been pre-treated in this manner is added to wort prepared from 2500 kg. of malt, and this mixture is boiled for 1¼ hours.

¾ of an hour before the termination of boiling, 4 kg. more of hops is added for aromatisation. 293 hectoliters of beer wort is obtained, further treatment of which is effected in a known manner. Technical progress is achieved in that the amount of hops used can be reduced by 23 to 30%, while the quality of the product remains the same.

(2) If the hop extract obtained by decoction of hop cones with water is not separated from the spent hops, the operation is as follows: Into the empty boiling or mash copper there is introduced a quantity of boiling water corresponding to one-eighth of the volume of the quantity of wort used. Between ⅔ and ¾ of the amount of hops which is used, and which is between 70 and 85% of the amount normally used, is then introduced into the boiling water.

During boiling, soda ($Na_2CO_3$) is added, and the mixture brought to between pH 6.2 and pH 7.5, after which boiling continues for half an hour. The wort and second wort are then introduced out of the straining vat or clarifying tub, and treatment of the wort is continued in a known manner. ¾ of an hour before the termination of boiling the remaining quarter of the amount of hops used, i. e. of the amount equivalent to between 70 and 85% of the normal quantity of hops, is added.

I claim:

1. A method for the preparation of wort by treating hop cones for a catalytic isomerization of humulon comprising boiling said hop cones in water to produce an extract thereof, drawing off said extract from said decocted hop cones and mixing said extract with a quantity of an alkaline solution of a weakly acid reactive medium to maintain in said extract during its isomerization an acidity of a pH equal to 6.2 to 7.5, boiling said extract for a duration of 10 minutes to 120 minutes and then adding said isomeric extract and said decocted hop cones to the boiling wort.

2. In a method according to claim 1 boiling said hop cones in a highly diluted sparging wort.

3. A method for the preparation of wort by treating hop cones for a catalytic isomerization of humulon comprising boiling said hop cones in water to produce an extract and decocted hop cones thereof, mixing said extract with a quantity of an alkaline solution of a weakly acid reactive medium to maintain a degree of acidity equal to a pH of 6.2 to 7.5 in said extract during isomerization, boiling said extract for a duration of ten minutes to 120 minutes and then adding said isomeric extract to the boiling wort.

4. A method for the preparation of wort by treating hop cones for a catalytic isomerization of humulon comprising boiling said hop cones in water to produce an extract thereof and decocted hop cones, drawing off said extract from said hop cones and mixing said extract with a quantity of an alkaline solution of a weakly acid reactive medium to maintain an acidity of not more than a pH equal to 7 in said extract during isomerization, boiling said extract under pressure of not more than 10 atmospheres and for not more than 90 minutes and adding said isomeric extract and said decocted hop cones to the boiling wort.

VÁCLAV SALAČ.

References Cited in the file of this patent

UNITED STATES PATENTS

| Number | Name | Date |
|---|---|---|
| 730,651 | Hobson | June 9, 1903 |
| 978,476 | Nilson | Dec. 13, 1910 |
| 992,275 | Smith | May 16, 1911 |
| 1,149,704 | Wahl | Aug. 10, 1915 |
| 1,800,632 | Horst | Apr. 14, 1931 |